United States Patent Office 2,899,397
Patented Aug. 11, 1959

2,899,397

POLYAMIDE RESIN-EPOXY RESIN AND EMULSIONS

David Aelony and Harold Wittcoff, Minneapolis, Minn., assignors to General Mills, Inc., a corporation of Delaware No Drawing. Application September 14, 1955
Serial No. 534,387

4 Claims. (Cl. 260—18)

The present invention relates to mixed aqueous emulsions of polyamide resins and epoxy resins.

As disclosed in the patent to Renfrew et al., 2,705,223, reactive polyamide resins may be used to cure epoxy resins. While these compositions represent distinct advantages over the use of other curing agents previously employed, the mixed resins react relatively rapidly to produce infusible and insoluble compositions. Where such compositions are intended for use as adhesives, laminating agents, potting and casting resins and the like, this relatively short reaction period means that the compositions have a relatively short pot life, requiring the preparation of the mixed resins at the point of use and in relatively small quantities.

It has been discovered that it is possible to produce mixed emulsions of polyamide resins and epoxy resins such that the emulsions have a substantially increased life before they react to form insoluble and infusible polymers. The life of such unreacted emulsions may extend as long as several days or even longer, the more dilute the oil phase of the emulsion, the longer the emulsion remains in the unreacted condition. Even though the resins begin to react the emulsion remains stable and can be used for the various purposes herein described until the degree of reaction is carried beyond that at which satisfactory properties are obtainable. The degree of reaction which may be tolerated in the emulsions will vary with the use to which the product is put. For example where the emulsion is to be used for a clear unpigmented coating, a relatively low degree of reaction may produce an insoluble material which will not give a clear film. On the other hand where the emulsion is to be used as an adhesive or in a pigmented coating composition, the presence of a small quantity of insoluble material can be tolerated.

It is possible, therefore, to prepare the emulsions in substantial quantity and even to store and ship the emulsions for reasonable periods of time. Numerous other advantages will be apparent from the detailed description of the invention.

It is, therefore, an object of the present invention to provide novel mixed emulsions of certain polyamide resins and epoxy resins and to provide a process of producing the same.

The polyamide resins employed are of the type derived from polymeric fat acids and aliphatic polyamines as described in the patent referred to. The preferred polyamides are those which have a substantial excess of free amine groups since these amine groups react rapidly with the epoxy resins at time of curing. Generally, the polyamide resin should have an amine number of at least 50 and generally within the range of 75-300 and a low acid number. The preferred polyamides are generally derived from polymeric fat acids and such polyalkylene polyamines as diethylene triamine, triethylene tetramine, tetraethylene pentamine, 3,3-imino-bis-propylamine.

Epoxy resins in general may be used in the present invention. These epoxy resins are complex polymeric reaction products of polyhydric phenols with polyfunctional halohydrins such as epichlorhydrin and glycerol dichlorhydrin. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin, and usually is employed in excess. The products obtained may contain terminal epoxy groups or terminal epoxy groups and terminal hydroxyl groups. In the complex reaction mixture the terminal epoxy groups are generally in excess of the terminal hydroxyl groups. Typical polyhydric phenols include resorcinol, and various bisphenols resulting from the condensation of phenol with aldehydes and ketones such as formaldehyde, acetaldehyde, acetone, methyl ethyl ketone, and the like. Resins of this type are disclosed in Greenlee Patent 2,585,115 and these resins are useful in the present invention.

The molecular weight of the epoxy resins may be controlled by the relative proportion of the reactants, as well as by the extent to which the reaction is carried on. The present invention may be applied to all epoxy resins. The molecular weight of the resin is not critical since both very low molecular weight resins, as well as very high molecular weight resins, can be cured by this method. The properties of the cured resin compositions may, of course, vary with the molecular weight of the epoxy resin employed, as well as the nature and molecular weight of the polyamide employed.

In the preparation of the emulsions, the two resins are separately dissolved in suitable solvents such that the viscosity of the mixed solution will permit agitation with water to prepare the emulsions.

The solids concentration of the solutions is preferably as high as possible while still permitting dispersion of the resins in the aqueous medium. With most resins, a solids concentration of from 10-50% is usually satisfactory. For the polyamide resins a hydroxylic solvent is used as a primary solvent. These include ethyl alcohol, isopropyl alcohol, butyl alcohol, 2-butoxy ethanol, monoethyl ether of diethylene glycol, tetrahydrofurfuryl alcohol, and the like. A secondary solvent may also be used, including aliphatic, naphthenic and aromatic hydrocarbons, ethers, esters, ketones, such as ethylene glycol monomethyl ether, xylene, dioxane, ethyl acetate, isopropyl acetate, butyl acetate, amyl acetate, acetone, methyl ethyl ketone, methyl isobutyl ketone, hexane, heptane, octane, methyl cyclohexane, etc.

The epoxy resin may be dissolved in a mixture of a polar and a non-polar solvent, such as a ketone and a hydrocarbon. Esters, alcohols, and ethers, may be substituted for the hydrocarbon. Typical ketones which may be used include methyl ethyl ketone, methyl isobutyl ketone, diisobutyl ketone, and the like.

In preparing the emulsion, the resins may be separately dissolved and the solutions mixed and then dispersed in water containing sufficient acid to form salt groups with the amine groups on the polyamide. The quantity of acid employed to stabilize the emulsion may vary from as little as 5% of the quantity equivalent to the free amine groups to a quantity which is fully equivalent to the amine groups. Generally, the employment of an equivalent of acid produces a higher viscosity than is desired. Generally, the acid is employed in a quantity of from 20 to 50% of that equivalent to the free amine groups. The particular acid which is employed is not critical and in general any water soluble, organic or inorganic acid may be employed. The preferred acids are the weak organic acids, acetic, formic, tartaric, citric and the like.

Numerous modifying agents, such as plasticizers, tackifiers, film formers and other resinous and non-resinous materials may be added to the mixed emulsions. They may be added to the solutions before emulsification or may be added to the emulsions.

The advantages of the water dispersions of the solvent solutions are manifold. First of all, there are all of the advantages inherent in water dispersions such as elimination of the use of expensive solvents, elimination of solvent toxicity and fire hazards, less impregnation of films into porous surfaces such as paper, more ready handleability, etc.

One of the important advantages of these systems, however, is the increase which is observed in the pot life of the polyamide-epoxy resins combinations. Surprisingly, the emulsions themselves are indefinitely stable even after the two resins start to interact.

Not only do these emulsions have good shelf stability but they have the unique ability of being stable at extremely low solids contents—e.g., one percent. Their mechanical stability is also excellent.

Another advantage of these systems is the ease with which viscosity of the final product may be controlled. Not only is this dependent on solids concentration, as might be expected, but also it is dependent on the quantity of acid present. Thus, if a viscous paste is desired for wet stick adhesives, a larger quantity of acid may be used. If, on the other hand, a fluid system is required, less acid is employed. It is of importance to note that stable fluid systems are obtainable even though less of the stabilizing acid is present. Obviously it is not possible to set down precisely what concentrations of acid are necessary since this depends on the specific system i.e., the specific polyamide, the specific epoxy resin and the specific acid which is being used.

Numerous uses may be described for these systems. They may be used as wet stick adhesives. These materials appear to adhere to a wide variety of surfaces, and this adhesion may be enhanced for various surfaces by controlling the solvent present. Thus, strong aromatic solvents increase adhesion to polyethylene, whereas ketonic solvents increase adhesion to vinyl films.

These films, amazingly enough, are also excellent heat seal adhesives. When laid down from the emulsions described in this invention, films are non-blocking and heat seal to a wide variety of surfaces over a very broad sealing range. This is an entirely unexpected observation since one would expect the films to cure, even at room temperature, to provide thermoset films which could not be heat sealing. This is not the situation, however, and we are at a loss to offer an explanation.

These emulsions may be used as beater or head box additives in the preparation of paper. The emulsions are of great interest as protective and decorative coatings of various sorts. Because these coatings are extremely flexible and have a high degree of adhesion they may be included on flexible as well as rigid substrates. Included among the flexible substrates are cellulose acetate, cellulose nitrate, polyvinylidene chloride, polyethylene, vinyl film, cellophane, polyethylene terephthalate and the like. Included among the non-flexible substrates are wood, metals of all sorts including copper, aluminum, magnesium, steel and iron, cured phenolics, cured polyesters and the like.

The emulsions are particularly attractive as paper coatings, since they do not penetrate into the paper as do solvent solutions and they eliminate a large portion of the cost, toxicity and fire hazards associated with the use of common paper varnishes.

The emulsions are also of great interest in the formulation of water base paints. Either the polyamide or the epoxy component may be pigmented and the paint can be mixed by the user who simply combines the two solvent solutions and adds water. One of the solvent solutions, preferably the polyamide solution, must contain either the acid or the base.

Such paints may be useful either for inside or outside applications. Paint films based on polyamide-epoxy resins demonstrate remarkable adhesion and flexibility. Baking at moderate temperatures enhances adhesion and hardness. The films have excellent alkali, acid, water, solvent and chemical resistance.

The emulsions in the current invention are of interest in numerous applications involving fabrication with glass fiber. They are excellent sizing agents for glass fiber. Their virtue over current sizing agents lies in the fact that they demonstrate better adhesion to the glass and also to laminating agents used in laminating glass mat or glass cloth. This is demonstrated particularly by the fact that the flexural strength of a laminate based on fiber sized with these emulsions is as much as 20 times greater than the flexural strength of similar structures employing fiber sized conventionally, when both structures are heated in water at 150° F. while under a load of 10,000 p.s.i.

These emulsions are also of value as sizing agents for glass "preforms" and for glass mat which are subsequently to be laminated into various shapes and objects. These emulsions are also valuable as binders and laminating agents for glass structures.

The emulsions of the present invention are of value as structural adhesives for metal, wood, ceramics, glass and other rigid materials. Finally, they may be used as binders for all sorts of particulate matter including cork, cellulosic materials, resinous materials, paper pulp, wood flour, asbestos fiber, textile fibers, clay, sand, plaster of Paris, pigments, leather, fiber and asbestos, numerous waste materials and the like. These emulsions are also excellent impregnants for paper, textiles, leather and other porous surfaces. These emulsions at lower concentrations (3–10% resin) may be applied to fabrics. If pigmented such emulsions may be used as textile printing pastes. The resinous coatings on fabrics provide a good hand, a degree of stiffness (which depends on the amount of resin applied), a degree of water repellence (depending on the weave and on the amount of resin applied).

*Example 1*

16.67 grams of a 60% solution in equal weights of toluene and isopropanol of a polyamide resin derived from polymeric fat acids and diethylene triamine having an amine number of from 80–90 were mixed with 0.236 ml. of 98% formic acid (0.4 equivalent) and 16.67 grams of a solution of an epoxy resin derived from bisphenol A and epichlorhydrin, dissolved in equal weights of toluene and methyl ethyl ketone. The resulting solution was emulsified by adding 66.484 ml. of water. The resulting suspension, when applied on paper, dried to a film of excellent appearance and properties. The film was a wet seal and a heat seal adhesive. The emulsion was useful as a wet stick and heat seal adhesive for more than 15 weeks.

*Example 2*

(a) 25 grams of each of the resin solutions of Example 1 were mixed with 0.265 ml. of 98% formic acid (0.3 equivalent). 50 ml. of water were gradually stirred in, resulting in a product of mayonnaise-like consistency. It spread nicely on paper and worked well both as a wet stick and heat seal adhesive. There was a noticeable thinning down of the product of a few days. After 19 days of standing, it was again applied on paper and worked well both as heat seal and as wet stick adhesive.

(b) The same type of emulsion was prepared as in (a) except that 0.354 ml. of formic acid (0.4 equivalent) were used. The product had the same consistency as (a) originally and retained this consistency and still was a satisfactory wet stick seal after 42 days.

(c) An emulsion was prepared as in (a) except that it was diluted to 40% solids. The product was much more fluid but had a reduced stability.

Example 3

(a) 25 grams of solution of polyamide resin from Example 1 were mixed with 7.5 grams of a commercial epoxy resin derived from bisphenol A and epichlorhydrin (Epon 828), 0.265 ml. formic acid (0.3 equivalent) and 67.5 ml. of water. The resultant product had a heavy cream consistency. It gave a glossy finish on paper and was a good heat seal adhesive.

(b) Example 3(a) above was duplicated except that the amount of water was reduced so that the finished product contained 30% solids. The product had a mayonnaise-like consistency and spread nicely on paper to give a film which heat sealed nicely over a wide sealing range.

(c) 33.5 grams of the polyamide resin solution of Example 1 were mixed with 15 grams of Epon 828, 0.354 ml. of formic acid (0.3 equivalent) and 51.5 ml. of water. The product had a mayonnaise-like consistency and gave a nice coating on paper. It was both a wet stick and a heat seal adhesive.

Example 4

10 grams of the polyamide resin solution of Example 1 were mixed with 0.3 equivalent of acetic acid and the resultant solution was mixed with 10 grams of a 60% solution of a commercial epoxy resin derived from bisphenol A and epichlorhydrin (Epon 1001), the resin being dissolved in equal weights of toluene and methyl ethyl ketone. The resultant product was a thick cream which gave a nice dull film on paper, which dried rapidly. The product was both a wet stick and a heat seal adhesive.

Example 5

(a) 1800 grams of Epon 1001 was ground for 24 hours with 2550 grams of titanium dioxide (Titanox RANC), 900 grams methyl isobutyl ketone, and 900 grams xylene. The resulting suspension had the following composition: Titanox RANC 41.6%, Epon 1001 29.2%, methyl isobutyl ketone 14.6%, xylene 14.6%.

(b) A solution of the following composition was made: polyamide resin of Example 1 59%, acetic acid 1.7% (0.3 equivalent), toluene 19.85%, isopropanol 19.85%.

(c) 100 grams of product (a) was mixed with 49 grams of product (b), 3 grams isopropanol, 6 grams xylene, and 128 ml. of water. The resulting emulsion had the following composition: Titanox RANC 14.5%, Epon 1001 10.2%, polyamide (0.3 equivalent acetic acid) 10.2%, methyl isobutyl ketone 5.1%, xylene 7.2%, isopropanol 4.6%, toluene 3.4%, water 44.8%. This emulsion was sprayed on tin plate and plate glass. Fifteen minutes after spraying it was baked 30 minutes at 150° to obtain a very glossy film. The film baked on glass had a Sward Rocker hardness of 38. Gloss per mil on the Gardner 60° glossmeter was 93 for glass and 91 for tin. The film on tin plate was not impaired by an impact of 60 inch pounds.

Example 6

(a) A medium chrome yellow grind in Epon 1001 of the following composition was made: medium chrome yellow 51.6%, wetting agent 0.5%, Epon 1001 23.9%, xylene 12%, methyl isobutyl ketone 12%.

(b) A solution of the following composition was made: Epon 1001 60%, methyl ethyl ketone 20%, toluene 20%.

(c) 100 grams of composition (a) was mixed with 24.7 grams of composition (b), 64.5 of composition (b) from Example 5, and 17.2 grams of isopropanol. This mixture was emulsified with 163.6 grams of water. The resulting emulsion was sprayed on tin plate and on glass plate and 15 minutes later was baked for 30 min. at 100° C. The film baked on glass had a Sward Rocker hardness of 42. Gloss per mil on the Gardner 60° glossmeter was 87 for glass and 77 for tin. The film on tin plate was unimpaired by an impact of 60 inch pounds.

Example 7

(a) A mixture of 832 grams of 97% red lead pigment, 68 grams of magnesium silicate (Nytal), 284 grams of a 60% solution of Epon 1001 in methyl ethyl ketone (20%), and toluene (20%) was shaken 30 min. on a paint shaker. The product had the following composition: 97% red lead 70.3%, Nytal 5.7%, Epon 1001 14.4%, methyl ethyl ketone 4.8%, toluene 4.8%.

(b) 100 grams of (a) was mixed with 58 grams of product (b) from Example 5 and 276 ml. of water. The resulting emulsion contained 25% solids. It was sprayed on glass and tin plate and 15 minutes later the panels were baked for 45 minutes at 120°. The Sward Rocker hardness on glass was 41. The film on the tin panel was unimpaired by 60 inch pounds of impact. Gloss per mil on glass was 92; on tin, 87.

Example 8

(a) 500 grams of Epon 1001 was dissolved in 250 grams of methyl isobutyl ketone and 250 grams of xylene.

(b) 40 grams of (a) was mixed with 33 grams of a 60% solution of polyamide resin of Example 1 (0.3 equivalent acetic acid) in isopropanol, 5 grams of xylene, and 2 grams oil yellow (Keystone). When the dye dissolved completely, the solution was emulsified with 53 ml. of water. The 30% solids emulsion was sprayed on glass and tin plate. Fifteen minutes after spraying, it was baked for 45 minutes at 120°. The film baked on glass had a Sward Rocker hardness of 54. The film on tin was unimpaired by 60 inch pounds impact. The films looked clear and glossy.

Example 9

80 grams of (a) from Example 8 was mixed with 66 grams of a 60% solution of the polyamide resin solution of Example 8 in isopropanol, 7 grams of xylene, 7 grams of isopropanol, and 106 ml. of water. The resulting 30% solids emulsion was applied on a steel plate with a 1.5 mil blade. Fifteen minutes later it was baked for 30 minutes at 120°. Average film thicknesses on three different plates were 0.45, 0.40, and 0.37 mil respectively. The films were unimpaired by 172 inch pounds impact. When exposed to ultraviolet light in a weather tester for 1 week, the films passed 172 inch pounds impact again. The gloss per mil was 90 after 1 week's exposure in the weather tester.

The same emulsion was sprayed on bonderized steel and 15 minutes later baked for 30 minutes at 120°. Film thicknesses were about 2 mils. The baked bonderized panels were scratched and subjected to a salt spray test. After two weeks of exposure only the scratched surfaces corroded.

Example 10

(a) 173 grams of lithol red, 495 grams of Epon 1001, 166 grams of xylene, 166 grams of methyl isobutyl ketone were ground in the paint shaker.

(b) 50 grams of (a) was mixed with 41 grams of product (b) of Example 5 and 100 grams of xylene. It was then mixed with 800 ml. of water, which was added little by little. The resulting heavy paste was sparingly applied with a spatula on a cotton fabric and baked for 15 minutes at 130–150°. The treated cloth was very slightly stiffer than the untreated cloth and had a much more pleasant hand than the untreated cloth. The treated cloth was also somewhat water repellent.

Treatment of fabrics with emulsions of the type (b) may impart color, stiffness, water repellence, and "hand."

Example 11

(a) 41.4 parts of titanium dioxide (titanox RANC)

was ground with 29.3 parts of Epon #1001, 14.65 parts of xylene and 14.65 parts of methyl isobutyl ketone.

(b) 100 grams of (a) was mixed with 15 grams of a 60% solution of Epon #1001 in methyl ethyl ketone and isopropanol (50:50) and 34 grams of a 60% solution of a polyamide resin which is the reaction product of triethylene tetramine and polymeric fat acids and has an amine number of about 230 in toluene and isopropanol (50:50). 5 ml. acetic acid was stirred in followed by 46 ml. of water. The resulting emulsion was applied on glass and tin plate with a 1½ mil blade and baked 15 minutes at 150° C. The films showed gloss per mil of 85 for glass and 92 for tin. The tin plate passed a 60 inch pounds impact test.

*Example 12*

(a) 200 g. of a polyamide resin which is the reaction product of triethylene tetramine, tetraethylene pentamine and polymeric fat acids and has an amine number of about 300 was dissolved in 100 g. isopropanol and 100 g. xylene.

(b) 10 g. (a) were mixed with 30 g. 50% solution of Epon #1001 in methyl isobutyl ketone and xylene (50:50), 1.7 ml. acetic acid and 38.3 ml. of water. An emulsion of nice consistency was formed which was applied on glass and tin plate with a 1½ mil blade. The plates were baked 15 minutes at 150° C. The glass plate had a Sward Rocker hardness of 40 and the tin plate passed a 60 inch pounds impact test.

*Example 13*

Salts like calcium stearate tend to thicken the emulsions. This makes it possible to obtain very thick pastes at low solids concentrations. Thus, this observation may be taken advantage of in the following formulation of a textile printing paste:

A red lead grind in an epoxy resin base was made with the following composition:

| | Percent |
|---|---|
| 97% red lead | 72.0 |
| Magnesium silicate (Nytal) | 5.9 |
| Epon 1001 | 9.5 |
| Methyl ethyl ketone | 3.2 |
| Toluene | 9.4 |

To 50 grams of this grind was added eight grams of a 60% solution of polyamide resin of Example 1 in equal parts of toluene and isopropyl alcohol. This solution contained 0.3 equivalent of acetic acid based on the amine groups in the polyamide resin. To this mixture was then added 20 grams of xylene, 1 gram of calcium stearate and 111 grams of water. A paste resulted which could be applied readily to cotton fabric. When the film was baked on the cloth for four minutes at 150° C., a printed surface resulted with good hand and with a high degree of water repellence.

We claim as our invention:

1. A process of producing a mixed aqueous emulsion of a solution of an epoxy resinous material containing terminal epoxy groups and a solution of a polymeric polyamide, said polyamide having a low acid number and an amine number within the approximate range of 50 to 300, and being the reaction product of an aliphatic polyamine and polymeric fat acids containing at least two carboxyl groups which comprises mixing the two solutions in the presence of an aqueous medium containing a water soluble organic carboxylic acid and agitating the mixture to produce an emulsion which is stabilized by means of salt groups formed from free amine groups and said water soluble organic acid.

2. A process according to claim 1 in which the quantity of acid employed is from 5% to 100% of the quantity equivalent to the free amine groups.

3. A process according to claim 1 in which the quantity of acid employed is from 20% to 50% of the quantity equivalent to the free amine groups.

4. Product produced according to the process of claim 1.

References Cited in the file of this patent

UNITED STATES PATENTS

| 2,640,037 | Parry et al. | May 26, 1953 |
| 2,681,901 | Wiles et al. | June 22, 1954 |
| 2,705,223 | Renfrew et al. | Mar. 29, 1955 |
| 2,707,708 | Wittcoff | May 3, 1955 |
| 2,728,737 | Wittcoff | Dec. 27, 1955 |
| 2,811,495 | Wittcoff et al. | Oct. 29, 1957 |